US012148986B2

(12) United States Patent
Wu

(10) Patent No.: US 12,148,986 B2
(45) Date of Patent: Nov. 19, 2024

(54) RADIATOR FOR ANTENNA AND BASE STATION ANTENNA

(71) Applicant: Outdoor Wireless Networks LLC, Claremont, NC (US)

(72) Inventor: Bo Wu, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 294 days.

(21) Appl. No.: 17/598,261

(22) PCT Filed: Mar. 17, 2020

(86) PCT No.: PCT/US2020/023106
§ 371 (c)(1),
(2) Date: Sep. 25, 2021

(87) PCT Pub. No.: WO2020/205225
PCT Pub. Date: Oct. 8, 2020

(65) Prior Publication Data

US 2022/0190470 A1 Jun. 16, 2022

(30) Foreign Application Priority Data

Mar. 29, 2019 (CN) ......................... 201910246296.8

(51) Int. Cl.
*H01Q 1/38* (2006.01)
*H01Q 19/10* (2006.01)

(52) U.S. Cl.
CPC ............... *H01Q 1/38* (2013.01); *H01Q 19/10* (2013.01)

(58) Field of Classification Search
None
See application file for complete search history.

(56) References Cited

U.S. PATENT DOCUMENTS 3,215,968 A 11/1965 Herrmann
4,677,521 A 6/1987 Frazier
5,712,607 A 1/1998 Dittmer et al.
7,322,833 B1 1/2008 Hakansson et al.
10,741,924 B1 * 8/2020 McGrath .................. H01Q 5/30
(Continued)

FOREIGN PATENT DOCUMENTS

CN 101673881 A 3/2010
CN 106356630 A 1/2017
(Continued)

OTHER PUBLICATIONS

"International Search Report and Written Opinion of the International Searching Authority", International Application No. PCT/US2020/023106, Jun. 9, 2020, 21 pp.
(Continued)

*Primary Examiner* — Wilson Lee
(74) *Attorney, Agent, or Firm* — Myers Bigel, P.A.

(57) ABSTRACT

A radiator for an antenna comprises a feed board and a metal radiating arm The feed board comprises an electrically conductive segment, through which the feed board feeds the metal radiating arm by means of capacitive coupling. The radiating arm includes a first arm segment extending in a first direction, and a second arm segment extending from an outer side region of the first arm segment in a second direction different from the first direction.

16 Claims, 6 Drawing Sheets

(56) References Cited

U.S. PATENT DOCUMENTS

| | | | | |
|---|---|---|---|---|
| 2002/0135527 | A1* | 9/2002 | Teillet | H01Q 9/28 343/797 |
| 2008/0038670 | A1 | 2/2008 | Card et al. | |
| 2012/0280882 | A1* | 11/2012 | Zimmerman | H01Q 21/0025 343/835 |
| 2013/0307743 | A1 | 11/2013 | Moon et al. | |
| 2014/0028516 | A1 | 1/2014 | Semonov et al. | |
| 2016/0285153 | A1 | 9/2016 | Li et al. | |
| 2017/0222306 | A1* | 8/2017 | Biscontini | H01Q 21/26 |
| 2017/0294715 | A1 | 10/2017 | Wu et al. | |
| 2017/0373370 | A1 | 12/2017 | Maley et al. | |
| 2018/0097293 | A1* | 4/2018 | Piegsa | H01Q 5/392 |
| 2018/0151944 | A1* | 5/2018 | Lubin | H01Q 21/30 |
| 2018/0294550 | A1* | 10/2018 | Segador Alvarez | H01Q 19/108 |
| 2019/0123443 | A1* | 4/2019 | Russell | H01Q 1/22 |
| 2020/0006861 | A1* | 1/2020 | Kasani | H01Q 19/108 |
| 2020/0108951 | A1* | 4/2020 | Cahoy | B64G 1/222 |
| 2020/0161748 | A1* | 5/2020 | Isik | H01Q 5/42 |
| 2020/0266545 | A1* | 8/2020 | Klein | H01Q 1/38 |
| 2020/0328533 | A1* | 10/2020 | Sundararajan | H01Q 9/28 |
| 2020/0335881 | A1* | 10/2020 | Le | H01Q 21/24 |
| 2021/0098863 | A1* | 4/2021 | Baek | H01Q 21/0025 |
| 2021/0194128 | A1* | 6/2021 | Ma | H01Q 1/48 |
| 2021/0265731 | A1* | 8/2021 | Plet | H01Q 1/24 |

FOREIGN PATENT DOCUMENTS

| | | | |
|---|---|---|---|
| CN | 208045677 | U | 11/2018 |
| EP | 3232504 | A1 | 10/2017 |
| JP | 5872018 | B1 | 1/2016 |
| WO | 2017165512 | A1 | 9/2017 |
| WO | 2017192819 | A1 | 11/2017 |
| WO | 2019052632 | A1 | 3/2019 |

OTHER PUBLICATIONS

“Extended European Search Report for European Application No. 20783335.1, dated Nov. 3, 2022, 9 pages”.

* cited by examiner

RADIATOR FOR ANTENNA AND BASE STATION ANTENNA

CROSS-REFERENCE TO RELATED APPLICATION

The present application is a 35 U.S.C. § 371 national stage application of PCT Application No. PCT/US2020/023106, filed on Mar. 17, 2020, which itself claims priority to Chinese Patent Application No. 201910246296.8, filed Mar. 29, 2019, the entire contents of both of which are incorporated herein by reference as if set forth fully herein in their entireties.

FIELD

The present invention relates generally to cellular communications systems and, more particularly, to radiators for base station antennas.

BACKGROUND

Multiple-Input Multiple-Output (MIMO) antenna systems are a core technology for next-generation mobile communications. MIMO antenna systems use multiple arrays of radiators for transmission and/or reception in order to improve communication quality. However, as the number of arrays of radiators mounted on a reflecting plate or "reflector" of an antenna increases, the spacing between radiators of adjacent arrays is typically decreased, which results in increased coupling interference between the arrays. The increased coupling interference degrades the isolation performance of the radiators, which may negatively affect the beam forming (BF) of the antennas.

SUMMARY

According to a first aspect of the present invention, a radiator for an antenna is provided. The radiator comprises a feed board having an electrically conductive segment, a radiating arm and a PCB coupling arm having an printed electrically conductive segment, wherein the radiating arm is configured as a metal radiating arm, and the radiating arm includes a first arm segment extending in a first direction, and a second arm segment extending in a second direction and starting from an outer side region of the first arm segment, wherein the second direction is different from the first direction, wherein the radiating arm is supported on the PCB coupling arm.

With respect to the radiator according to the embodiments of the present invention, the dimension of horizontal extension of the radiator is advantageously reduced while maintaining the effective electrical length of the radiating arm, thereby enlarging the spacing between the adjacent radiators and improving the performance of the radiator in a cost-effective manner.

In some embodiments, the feed board feeds the radiating arm by means of a capacitive coupling.

In some embodiments, at least a portion of the first arm segment of the radiating arm is disposed on the PCB coupling arm, and the capacitive coupling is formed between the at least a portion of the first arm segment of the radiating arm and the electrically conductive segment of the PCB coupling arm.

In some embodiments, the feed board is configured as a PCB feed board, and the electrically conductive segment of the feed board is configured as a printed electrically conductive segment.

In some embodiments, the electrically conductive segment of the PCB coupling arm is electrically connected with the electrically conductive segment of the feed board.

In some embodiments, the PCB coupling arm has an engaging groove, the feed board comprises a tab having the electrically conductive segment of the feed board, and the tab is configured to be inserted through the engaging groove and to be electrically connected with the electrically conductive segment of the PCB coupling arm.

In some embodiments, a dielectric layer is provided between the at least a portion of the first arm segment of the radiating arm and the electrically conductive segment of the PCB coupling arm.

In some embodiments, the dielectric layer comprises a solder mask layer on a surface of the PCB coupling arm.

In some embodiments, the dielectric layer comprises air and/or a spacer.

In some embodiments, the area of the PCB coupling arm is smaller than the area of the radiating arm.

In some embodiments, the area of the PCB coupling arm is smaller than the area of the first arm segment of the radiating arm.

In some embodiments, the upper limit value of the ratio of the area of the PCB coupling arm to the area of the radiating arm is selected from the following values: 0.9, 0.8, 0.7, 0.6, 0.5, 0.4, 0.3, 0.2, or 0.1.

In some embodiments, the radiator is mounted on a reflector, the feed board extends forward from the reflector and engages with the PCB coupling arm, and the PCB coupling arm is supported on the feed board in an orientation substantially parallel to the reflector.

In some embodiments, the first arm segment of the radiating arm is supported on the PCB coupling arm in an orientation substantially parallel to the reflector, and the second arm segment of the radiating arm extends from the outer side region of the first arm segment in a direction that is away from the reflector.

In some embodiments, both side edges of the first arm segment are each provided with a second arm segment that extends away from the reflector.

In some embodiments, the second direction intersects the first direction.

In some embodiments, the second direction and the first direction form an angle between 80 degrees and 100 degrees.

In some embodiments, the upper limit value of the ratio of the area of the first arm segment to the area of the radiating arm is selected from the following values: 0.9, 0.8, 0.7, 0.6, 0.5, 0.4, 0.3, 0.2, or 0.1.

In some embodiments, the radiating arm is fixed to the PCB coupling arm by means of a fastener and/or an adhesive layer.

In some embodiments, the first arm segment and the second arm segment of the radiating arm are constructed as a monolithic structure.

According to a second aspect of the present invention, a radiator for an antenna is provided. The radiator comprises a feed board and a radiating arm, the radiating arm is configured as a metal radiating arm, and the metal radiating arm includes a first arm segment extending in a first direction, and a second arm segment extending in a second direction and starting from an outer side region of the first arm segment, wherein the second direction is different from the first direction, wherein the radiator further includes a radiating arm supporting plate, that is made of dielectric material or comprises dielectric material, for supporting the radiating arm, wherein the feed board feeds the metal radiating arm by means of a capacitive coupling.

In some embodiments, the radiating arm includes a coupling portion, the feed board includes a coupling portion having an electrically conductive segment, and the capacitive coupling is formed between the coupling portion of the radiating arm and the coupling portion of the feed board so as to feed the radiating arm.

In some embodiments, the radiator is mounted on a reflector, the feed board extends forward from the reflector, and the radiating arm supporting plate is supported on the feed board in an orientation substantially parallel to the reflector.

In some embodiments, the first arm segment of the radiating arm is supported on the radiating arm supporting plate in an orientation substantially parallel to the reflector, and the second arm segment of the radiating arm extends from an outer side region of the first arm segment in a direction that is away from the reflector.

In some embodiments, the radiating arm supporting plate has a slot, and the coupling portion of the feed board is inserted through the slot such that the coupling portion of the feed board and the coupling portion of the radiating arm are opposite to each other.

In some embodiments, the feed board includes a snap portion formed only of dielectric material, the snap portion being inserted through a slot in the radiating arm supporting plate and a slot in the radiating arm to be snapped onto the radiating arm.

In some embodiments, each of the radiating arms comprises one or two coupling portions, which extend away from the reflector from an inner end of the radiating arm.

In some embodiments, where the radiating arm has two coupling portions, the coupling portion of the feed board is disposed between the two coupling portions of the radiating arm, the coupling portion of the feed board comprising electrically conductive segments on its two major surfaces.

In some embodiments, the coupling portion of the feed board comprises printed electrically conductive segments on its two major surfaces, and the printed electrically conductive segments are provided with at least one electrically conductive element that extend through the coupling portion of the feed board to electrically connect the printed electrically conductive segments on the two major surfaces.

In some embodiments, a dielectric layer is provided between the coupling portion of the radiating arm and the coupling portion of the feed board.

In some embodiments, the dielectric layer comprises a solder mask layer on a surface of the coupling portion of the feed board.

In some embodiments, the dielectric layer comprises air and/or a spacer.

In some embodiments, the first arm segment and the second arm segment of the radiating arm are constructed as a monolithic structure.

According to a third aspect of the present invention, a radiator for an antenna is provided. The radiator comprises a PCB feed board, a PCB coupling arm and a metal radiating arm, wherein the metal radiating arm includes a first arm segment extending in a first direction, and a second arm segment extending from an outer side region of the first arm segment in a second direction different from the first direction, wherein the PCB feed board has a printed electrically conductive segment, and the PCB coupling arm has a printed electrically conductive segment that is electrically connected with the electrically conductive segment of the PCB feed board, wherein the first arm segment of the metal radiating arm is partially or completely supported on the PCB coupling arm, and at least a portion of the first arm segment of the metal radiating arm and the electrically conductive segment of the PCB coupling arm are opposite to each other and thus a capacitive coupling is formed therebetween, and the PCB feed board feeds the metal radiating arm by means of the capacitive coupling.

In some embodiments, the PCB coupling arm has an engaging groove, the PCB feed board comprises a tab having the electrically conductive segment of the PCB feed board, and the tab configured to be is inserted through the engaging groove and to be electrically connected with the electrically conductive segment of the PCB coupling arm.

In some embodiments, a dielectric layer is provided between the at least a portion of the first arm segment of the radiating arm and the electrically conductive segment of the PCB coupling arm, the dielectric layer including a solder mask layer on a surface of the PCB coupling arm.

In some embodiments, the radiator is mounted on a reflector, the PCB feed board extends forward from the reflector and engages with the PCB coupling arm, the PCB coupling arm is supported on the PCB feed board in an orientation substantially parallel to the reflector, the first arm segment of the metal radiating arm is supported on the PCB coupling arm in an orientation substantially parallel to the reflector, and the second arm segment of the metal radiating arm extends from the outer side region of the first arm segment in a direction that is away from the reflector.

According to a fourth aspect of the present invention, a radiator for an antenna is provided. The radiator comprises a PCB feed board, a metal radiating arm and a radiating arm supporting plate made of dielectric material or comprising dielectric material, wherein the metal radiating arm includes a first arm segment extending in a first direction, and a second arm segment extending from an outer side region of the first arm segment in a second direction different from the first direction, wherein the first arm segment of the metal radiating arm is partially or completely supported on the radiating arm supporting plate, wherein the metal radiating arm includes a coupling portion on its inner end region, the PCB feed board includes on its upper inner end region a coupling portion having a printed electrically conductive segment, and the coupling portion of the radiating arm and the coupling portion of the feed board are opposite to each other and thus a capacitive coupling is formed therebetween, and the PCB feed board feeds the metal radiating arm by means of the capacitive coupling.

In some embodiments, the metal radiating arm supporting plate has a slot, and the coupling portion of the PCB feed board is inserted through the slot so that the coupling portion of the PCB feed board and the coupling portion of the metal radiating arm are opposite to each other.

In some embodiments, a dielectric layer is provided between the coupling portion of the metal radiating arm and the coupling portion of the PCB feed board, the dielectric layer including a solder mask layer on a surface of the coupling portion of the PCB feed board.

In some embodiments, the radiator is mounted on a reflector, the PCB feed board extends forward from the reflector, and the radiating arm supporting plate is supported on the PCB feed board in an orientation substantially parallel to the reflector, wherein the first arm segment of the radiating arm is supported on the radiating arm supporting plate in an orientation substantially parallel to the reflector, and the second arm segment of the radiating arm extends from an outer side region of the first arm segment in a direction that is away from the reflector.

According to a fifth aspect of the present invention, a base station antenna is provided, comprising a reflector and an array of radiators disposed on the reflector, wherein the radiator in the array of radiators is configured as the radiator according to the present invention.

DETAILED DESCRIPTION

Figure 1:
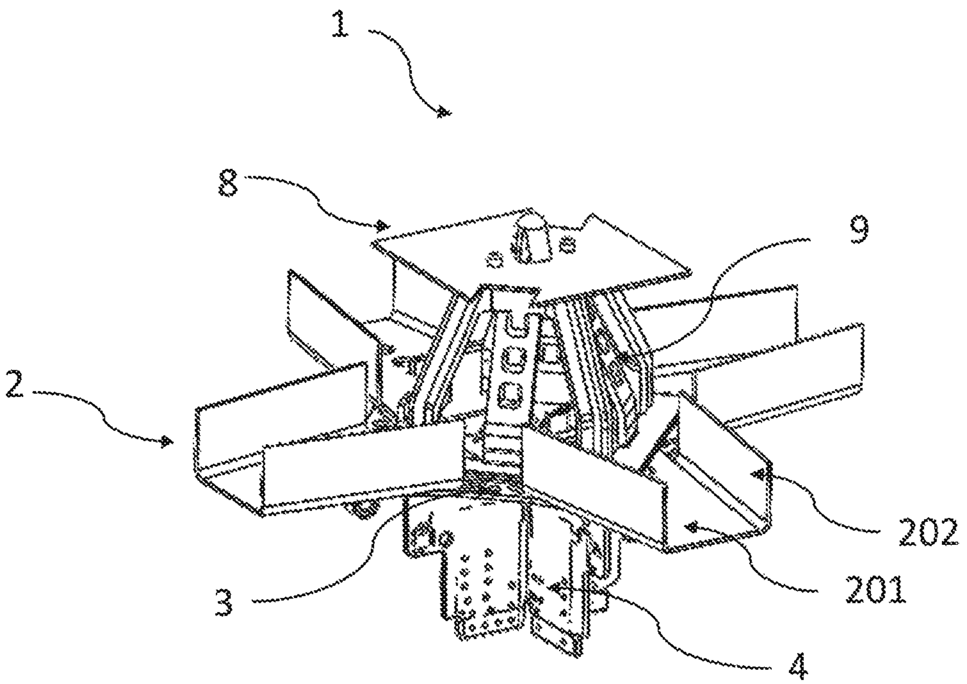
FIG. 1 is a perspective view of a radiator according to a first embodiment of the present invention.

Embodiments of the present invention will be described below with reference to the drawings, in which several embodiments of the present invention are shown. It should be understood, however, that the present invention may be implemented in many different ways, and is not limited to the example embodiments described below. In fact, the embodiments described hereinafter are intended to make a more complete disclosure of the present invention and to adequately explain the scope of the present invention to a person skilled in the art. It should also be understood that, the embodiments disclosed herein can be combined in various ways to provide many additional embodiments.

It should be understood that, the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

It should be understood that, in all the drawings, the same reference signs present the same elements. In the drawings, for the sake of clarity, the sizes of certain features may be modified.

Embodiments of the present invention will now be described in more detail with reference to the accompanying drawings, in which exemplary embodiments are described.

The radiators according to embodiments of the present invention are applicable to various types of antennas, and may be particularly suitable for MIMO antennas. The MIMO antennas typically have multiple arrays of radiators. The arrays may be, for example, linear arrays of radiators or two-dimensional arrays of radiators. Only a single radiator in the array is shown below. It should be noted that in the discussion that follows, the radiators are described consistent with the orientation shown in the figures. It will be appreciated that base station antennas are typically mounted so that a longitudinal axis thereof extends in the vertical direction, and the reflector of the antenna likewise extends vertically. When mounted in this fashion, the radiators typically extend forward from the reflector, and hence are deflected about 90° from the orientations shown in the figures.

As described above, as a large number of radiators (for example, one or more arrays of low band radiators, one or more arrays of mid band radiators, and one or more arrays of high band radiators) are integrated on the reflector with limited area, the spacing between the radiators is reduced. This results in the isolation between different radiators, especially between dipoles of the same polarization (also referred to as Co-pol isolation) getting worse. At present, a principal challenge in the design of MIMO antennas is to improve the isolation between the radiators, especially the isolation between radiators of different arrays that operate at the same frequency, as this can affect the beam forming performance of the antennas.

Figure 2:
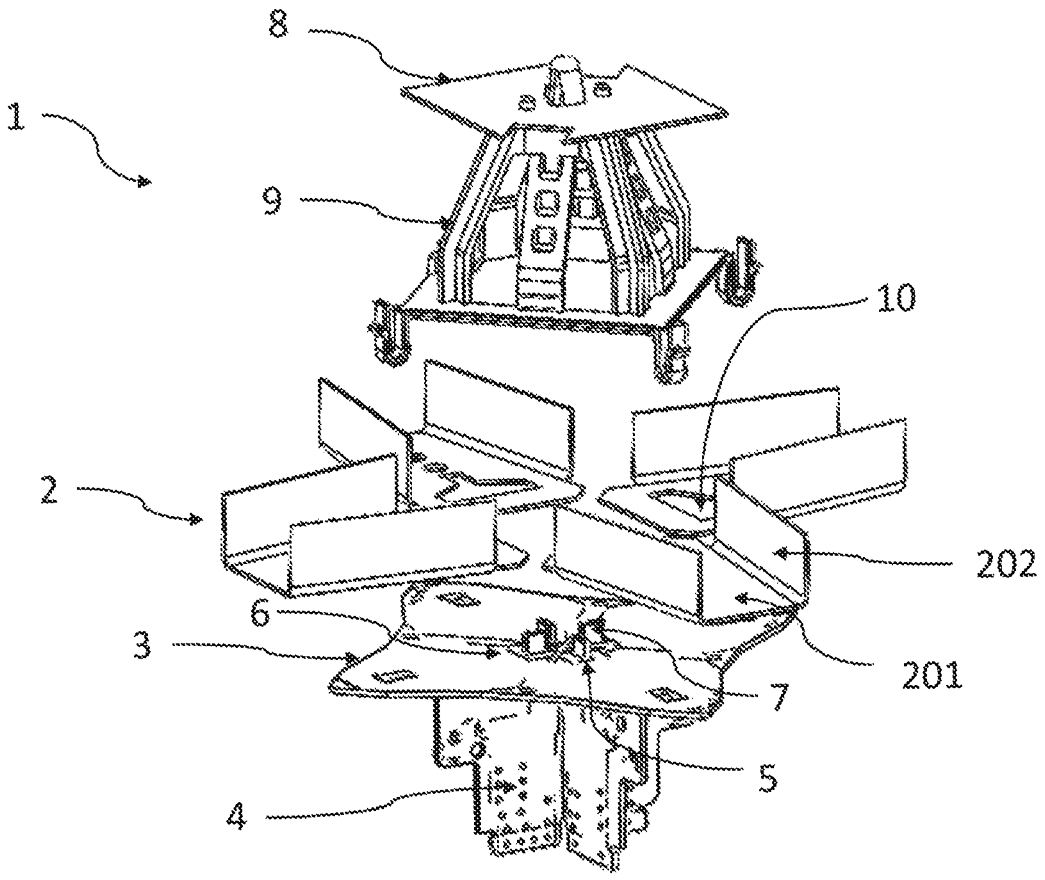
FIG. 2 is an exploded view of the radiator of FIG. 1.

Now, a radiator 1 according to a first embodiment of the present invention will be described with reference to FIGS. 1 and 2, where FIG. 1 is a perspective view of the radiator 1 according to the first embodiment of the present invention, and FIG. 2 is an exploded view of the radiator 1 according to the first embodiment of the present invention.

As shown in FIGS. 1 and 2, the radiator 1 may be constructed as a dual-polarization dipole radiator 1 including two horizontally-extending dipoles, each dipole having two radiating arms 2 arranged at 180 degrees from each other. Further, the radiator 1 also includes a PCB coupling arm 3 and a feed board 4. The radiator 1 is mounted on a reflector (not shown), the feed board 4 of the radiator 1 extends forward from the reflector and engages with the PCB coupling arm 3, and the PCB coupling arm 3 is supported on the feed board 4 in an orientation substantially parallel to the reflector. Each of the PCB coupling arms 3 has a corresponding radiating arm 2 supported thereon.

The feed boards 4 may be constructed as a pair of printed circuit boards, that is, constructed as PCB feed boards. The pair of printed circuit boards are oriented at an angle of 90° with respect to each other so as to have a cross-section in the form of an X. A feed PCB board (not shown) may be mounted on the reflector, and a base of the feed board 4 may be mounted on the feed PCB board. A feed circuit is provided on each printed circuit board of the feed board 4, and the feed circuit may provide respective signal paths from the feed PCB board to each respective pair of radiating arms 2.

The PCB coupling arm 3 may be constructed as a printed circuit board having a printed electrically conductive segment. In the present embodiment, the PCB coupling arm 3 is not only configured to support the respective radiating arm 2, but also to feed (may also be referred to as "indirectly feed" herein), based on the electrical connection with the feed board 4, the radiating arm 2 by means of a capacitive coupling between the PCB coupling arm 3 and the radiating arm 2 supported thereon.

In order to achieve an effective electrical connection between the PCB coupling arm 3 and the feed board 4, in other words, in order to achieve an effective electrical connection between the electrically conductive segment of the PCB coupling arm 3 and the electrically conductive segment of the feed board 4, an engaging groove 5 is provided on an inner end of each PCB coupling arm 3 and a pad 6 is disposed around the engaging groove 5. Correspondingly, a tab 7 having a printed electrically conductive segment is provided on an upper end of each feed board 4, and the tab 7 is inserted through the engaging groove 5 in the corresponding PCB coupling arm 3 and electrically connected to the printed electrically conductive segment on the PCB coupling arm 3, for example, by being soldered to the pad 6. In this way, the PCB coupling arm 3 can be placed reliably on the feed board 4 and fed by the feed board 4.

The radiating arm 2 may be constructed as a metal radiating arm, and may be constructed as a sheet metal (for example, a copper radiating arm or an aluminum radiating arm). As shown in FIGS. 1 and 2, the radiating arm 2 includes a first arm segment 201 and a second arm segment 202, wherein the first arm segment 201 is supported on the PCB coupling arm 3 in an orientation substantially parallel to the reflector, and the second arm segment 202 extends, preferably vertically, away from the reflector from an outer side region of the first arm segment 201. Two side edges of the first arm segment 201 are each provided with a second arm segment that extends away from the reflector. That is, in the present embodiment, the radiating arm 2 has one horizontally-extending first arm segment 201, and two second arm segments 202 that extend vertically forward from the outer side region of the first arm segment 201. Owing to the good ductility of metal, the first arm segment 201 and the second arm segments 202 of the radiating arm 2 may be constructed as a monolithic structure. This makes it possible to bend the metal radiating arm in a simple and cost-effective manner.

Compared with the two-dimensional extension of the major surfaces of radiating arms of the radiator, major surfaces of the radiating arms of the radiator 1 according to the embodiments of the present invention extend to a three-dimensional space. Based on the bended second arm segments 202, the radiation area of the radiating arm 2 may be effectively increased. In this way, the dimension of horizontal extension of the radiator 1 is advantageously reduced while maintaining the effective electrical length of the radiating arm, thereby enlarging the spacing between the adjacent radiators 1 and improving the isolation between the radiators 1.

In the present embodiment, only the first arm segment 201 is placed directly on the PCB coupling arm 3, whereas the second arm segments 202 extend from the outer side region of the first arm segment 201 in a direction that is away from the reflector. The ratio of the area of the first arm segment 201 to the area of the second arm segments 202 may be diverse, thereby able to well adapt to the actual application situations. Technicians may simulate various area ratios at the beginning of the design so as to perform a preliminary test on the function of the radiator 1, and may further make a flexible modification based on the test results. The upper limit value of the ratio of the area of the first arm segment 201 to the area of the overall radiating arm 2 (i.e. the sum of the area of the first arm segment 201 and the area of the second arm segments 202) is selected from the following values: 0.9, 0.8, 0.7, 0.6, 0.5, 0.4, 0.3, 0.2 or 0.1.

In the present embodiment, the area of the PCB coupling arm 3 is larger than the area of the first arm segment 201 of the radiating arm 2. In other embodiments, the area of the PCB coupling arm 3 may be smaller than the area of the first arm segment 201 of the radiating arm 2, that is, only a portion of the first arm segment 201 is disposed directly on the PCB coupling arm 3, and a capacitive coupling is formed between this portion of the first arm segment 201 and the electrically conductive segment of the PCB coupling arm 3. In the case where the capacitive coupling can meet the requirement, the area of the PCB coupling arm 3 may be designed to be as small as possible. For example, the area of the PCB coupling arm 3 may be 0.8, 0.7, 0.6, 0.5, 0.4, 0.3 or 0.2 times the area of the first arm segment 201, such that the manufacturing cost of the radiator 1 can be reduced significantly.

In the case where a capacitive coupling is formed between at least a portion of the first arm segment 201 and the PCB coupling arm 3, this portion of the first arm segment 201 and the printed electrically conductive segment of the PCB coupling arm 3 (which is electrically connected with the printed electrically conductive segment of the feed board 4) are equivalent to two equivalent opposing metal plates of the capacitive coupling, and the solder mask layer on the surface of the PCB coupling arm 3 is equivalent to a dielectric layer of the capacitive coupling. In order to adjust the capacitance of the capacitive coupling, the area of the first arm segment 201 and/or of the PCB coupling arm 3 may be adjusted so as to change the effective overlap area of the coupling capacitor. It is also possible to provide a dielectric layer such as air and/or a spacer of other dielectric constants between the first arm segment 201 and the PCB coupling arm 3, to thereby change the dielectric constant and spacing of the coupling capacitor.

Most arrays of radiators 1 are designed to operate in at least portions of one or more of three wide frequency bands, that is, a low-band frequency range that extends from 617 MHz to 960 MHz, a mid-band frequency range that extends from 1690 MHz to 2690 MHz, and a high-band frequency range that extends from 3.3 GHz to 5.8 GHz. In addition, an ultra-wideband radiator is configured to operate in a wideband frequency range that extends from approximately 1.4 GHz to 2.7 GHz. In the case where the radiator is a half-wavelength radiator, the impedance matching can be achieved when the height of the feed board of the radiator 1 above the reflector reaches one quarter of the wavelength corresponding to a center frequency of the desired operating frequency range. When the operating band of the radiator 1 is mainly concentrated in the mid and high bands, the upward extension of the second arm segment 202 is advantageous, because within these operating bands, the height of the feed board 4 is relatively small, and if the second arm segment 202 extends downward, the second arm segment 202 of the radiating arm 2 would be too close to the reflector below the radiator 1, thereby affecting the RF performance of the radiator. It should be noted that in other embodiments, the second arm segment 202 of the radiating arm 2 may also extend downward from the first arm segment 201. Further, the radiating arm 2 may also have only one first arm segment 201 and one second arm segment 202, and the shape of the first arm segment 201 and the second arm segment 202 may also be diverse. Furthermore, when the operating band of the radiator 1 is mainly concentrated in the mid and high bands, a small coupling area between the PCB coupling arm and the radiating arm is enough to achieve effective coupling feed.

For mounting of the radiating arm 2 to the respective PCB coupling arm 3, the radiating arm 2 may be mounted to the respective PCB coupling arm 3 by means of additional fasteners, for example, by means of plastic rivets. In other embodiments, any other fasteners may also be envisaged. It is also possible for the radiating arm 2 to be bonded to the respective PCB coupling arm 3 by means of an adhesive layer, in which case the adhesive layer may also be regarded as a dielectric layer of the capacitive coupling.

Additionally or alternatively, the radiator 1 may also include a director 8 for improving the pattern of the radiator 1. For this purpose, a director support 9 is provided for supporting the director 6. In the present embodiment, a receiving opening 10 is provided in the radiating arm 2 for fixing the respective director support 9. In other embodiments, the receiving opening 10 may also be provided in the PCB coupling arm 3.

Figure 3:
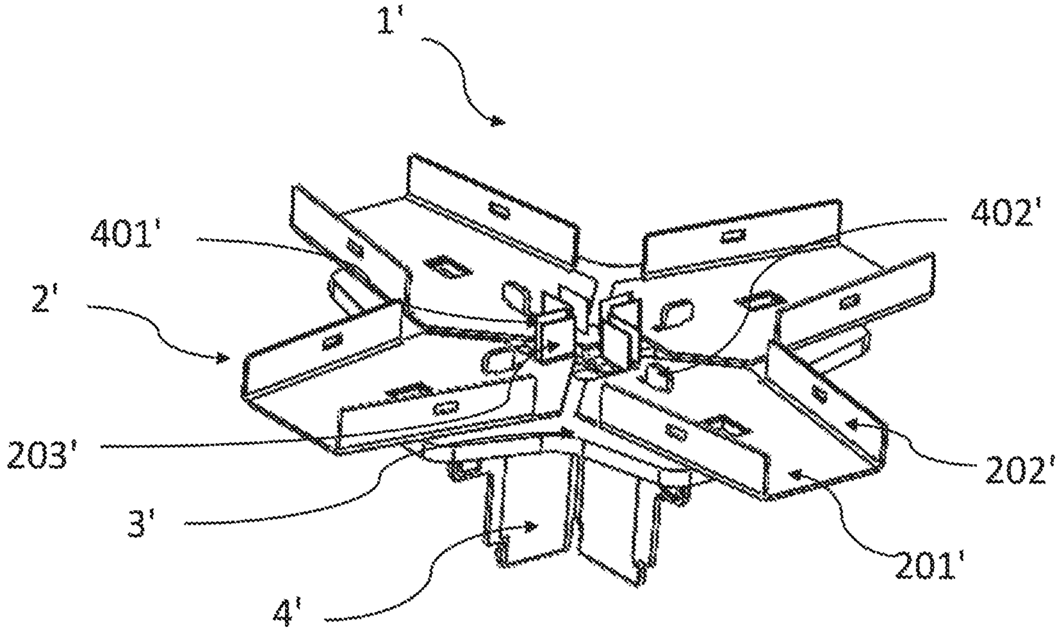
FIG. 3 is a perspective view of a radiator according to a second embodiment of the present invention.
Figure 4A:
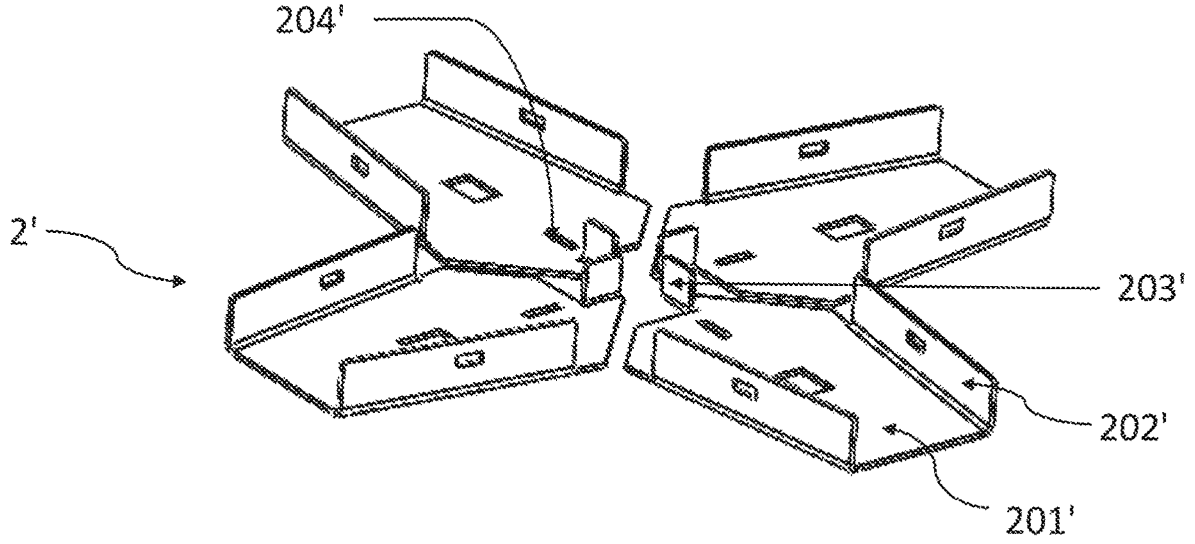
FIG. 4*a* is a perspective view of a radiating arm of the radiator of FIG. 3.
Figure 4B:
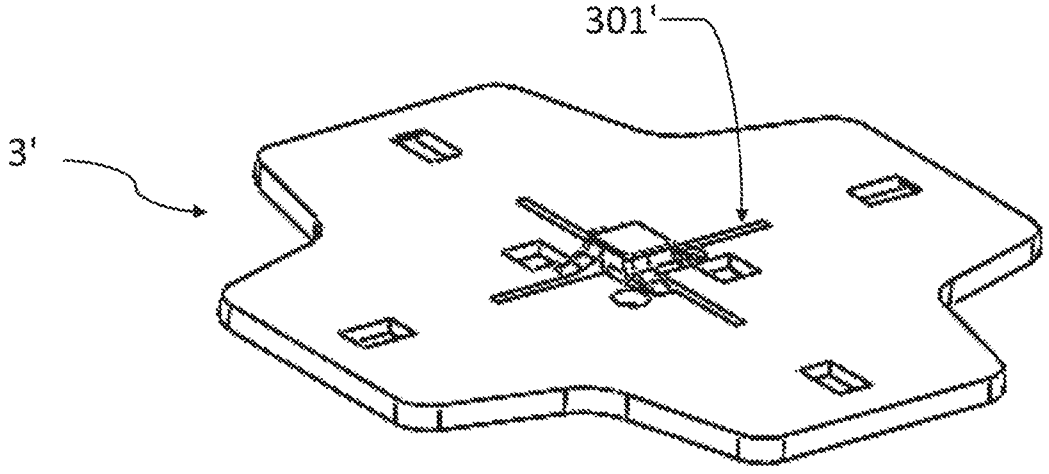
FIG. 4*b* is a perspective view of a radiating arm supporting plate of the radiator of FIG. 3.
Figure 4C:
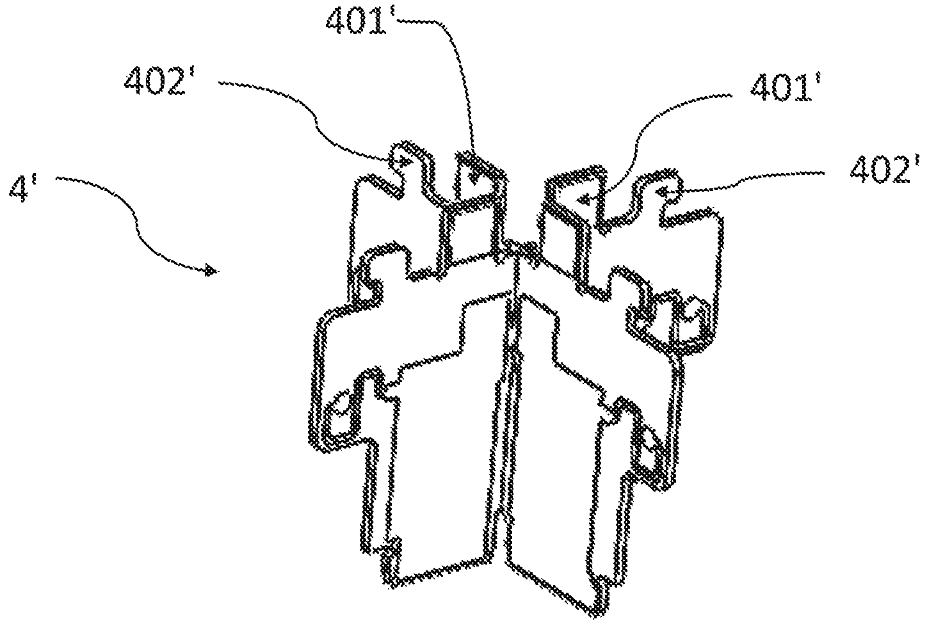
FIG. 4*c* is a perspective view of a feed board of the radiator of FIG. 3.

Next, a radiator 1' according to a second embodiment of the present invention is shown with reference to FIGS. 3, 4*a*, 4*b* and 4*c*, where FIG. 3 is a perspective view of the radiator 1' according to the second embodiment of the present invention, FIG. 4*a* is a perspective view of a radiating arm 2' of the radiator 1' of FIG. 3, FIG. 4*b* is a perspective view of a radiating arm supporting plate 3' of the radiator 1' of FIG. 3, and FIG. 4*c* is a perspective view of a feed board 4' of the radiator 1' of FIG. 3.

As shown in FIGS. 3, 4*a*, 4*b* and 4*c*, the radiator 1' may be constructed as a dual-polarization dipole radiator 1' including two horizontally-extending dipoles, each dipole having two radiating arms 2' arranged at 180 degrees from each other. Further, the radiator 1' also includes a radiating arm supporting plate 3' and a feed board 4'. The radiating arm supporting plate 3' may, for example, be made of a dielectric material or comprise a dielectric material for supporting the respective radiating arm 2'. The radiator 1' is mounted on a reflector (not shown), and the feed board 4' extends forward from the reflector. The radiating arm supporting plate 3' is supported on the feed board 4' in an orientation substantially parallel to the reflector. Additionally or alternatively, the radiator 1' may also comprise a director (not shown in this embodiment), like the first embodiment according to the present invention, for improving the pattern of the radiator 1'.

The feed boards 4' may be constructed as a pair of printed circuit boards, that is, constructed as PCB feed boards. The pair of printed circuit boards are oriented at an angle of 90° with respect to each other so as to have a cross-section in the form of an X. A feed PCB board (not shown) may be mounted on the reflector, and a base of the feed board 4' may be mounted on the feed PCB board. A feed circuit is provided on each printed circuit board of the feed board 4', and the feed circuit may provide respective signal paths from the feed PCB board to each respective pair of radiating arms 2'.

In the present embodiment, the radiating arm 2' may be constructed as a metal radiating arm, for example as a sheet metal (for example, a copper radiating arm or an aluminum radiating arm). The radiating arm 2' comprises a first arm segment 201' and a second arm segment 202'. The first arm segment 201' is supported on the radiating arm supporting plate 3' in an orientation substantially parallel to the reflector, and the second arm segment 202' extends from an outer side region of the first arm segment 201' in a direction that is away from the reflector. Two side edges of the first arm segment 201' are each provided with a second arm segment 202' that extends away from the reflector. That is, the radiating arm 2' has one horizontally-extending first arm segment 201', and two second arm segments 202' that extend vertically forward from the outer side region of the first arm segment 201'.

Likewise, compared with the two-dimensional extension of the major surfaces of the radiating arms of the radiator, the radiating arms of the radiator 1' according to the embodiment of the present invention extend to a three-dimensional space. Based on the bended second arm segments 202', the radiation area of the radiating arm 2' may be effectively increased. In this way, the dimension of horizontal extension of the radiator 1' is advantageously reduced while maintaining the effective electrical length of the radiating arm, thereby enlarging the spacing between the adjacent radiators 1' and improving the isolation between the radiators.

Compared with the radiator 1 according to the first embodiment of the present invention, the radiator 1' according to the second embodiment of the present invention is not additionally provided with the PCB coupling arm 3 for (indirect) coupling feed of the radiating arm 2'. In the radiator 1' according to the second embodiment of the present invention, the feed board 4' feeds the radiating arm 2' (directly) by means of capacitive coupling. In other words, a direct coupling feed is created between the feed board 4' and the radiating arm 2'.

Next, the specific implementing means of the coupling feed of the radiator 1' according to the second embodiment of the present invention will be described. In the present embodiment, the radiating arm 2' comprises a coupling portion 203'. Correspondingly, the feed board 4' comprises a coupling portion 401' having an electrically conductive segment. The coupling portion 401' of the feed board and the coupling portion 203' of the radiating arm are configured to be opposite to each other, preferably in a parallel manner, thereby forming the capacitive coupling therebetween to feed the radiating arm 2'. Specifically, each of the radiating arms 2' may have a coupling portion 203', which extends vertically from the inner end of the radiating arm 2' in a direction that is away from the reflector. Correspondingly, the feed board 4' has, on its upper inner end, a coupling portion 401' that extends forward, and each coupling portion 401' of the feed board corresponds to a coupling portion 203' of the radiating arm. For this purpose, the radiating arm supporting plate 3' comprises a slot 301', and the coupling portions 401' of the feed board are inserted through the corresponding slots 301' so that the coupling portion 401' of the feed board and the respective coupling portions 203' of the radiating arms are configured to be opposite to each other, preferably in a parallel manner. In FIG. 3, in order to make the coupling portion 203' of the radiating arm and the coupling portion 401' of the feed board visible, a large interval is shown between the coupling portion 203' of the radiating arm and the coupling portion 401' of the feed board. In fact, as a solder mask layer is provided on a surface of the coupling portion 401' of the feed board, the coupling portion 203' of the radiating arm and the coupling portion 401' of the feed board may be abutted against each other.

In the case where a capacitive coupling is formed between the coupling portion 203' of the radiating arm and the coupling portion 401' of the feed board, the coupling portion 203' of the radiating arm and the printed electrically conductive segment of the coupling portion 401' of the feed board are equivalent to two equivalent opposite metal plates of the capacitive coupling, and the solder mask layer on the surface of the coupling portion 401' of the feed board is equivalent to a dielectric layer of the capacitive coupling (the dielectric layer can prevent direct electrical contact between the coupling portion 203' of the radiating arm and the coupling portion 401' of the feed board, effectively reducing passive intermodulation).

In order to adjust the capacitance of the capacitive coupling, the area of the coupling portion 203' of the radiating arm and/or of the coupling portion 401' of the feed board may be adjusted so as to change the effective overlap area of the capacitive coupling. It is also possible to provide a dielectric layer such as air and/or a spacer of other dielectric constants between the coupling portion 203' of the radiating arm and the coupling portion 401' of the feed board, to thereby change the dielectric constant and spacing of the coupling capacitor. Further, when the operating band of the radiator 1' is mainly concentrated in the mid and high bands, effective coupling feed can be achieved with only a small coupling area.

In other embodiments, each of the radiating arms 2' may be provided with two coupling portions 203', both of which, spaced apart at a distance from each other, extend vertically from the inner end of the radiating arm 2' in a direction that is away from the reflector. Correspondingly, the feed board 4' is provided, on its upper inner end, with coupling portions 401' that extend vertically forward, and each coupling portion 401' of the feed board is likewise inserted through the slot 301' in the radiating arm supporting plate 3' so that the coupling portion 401' of the feed board is located at the interval between the two coupling portions 203' of the radiating arm to thereby form a dual-capacitor coupling. In this case, the coupling portion 401' of the feed board located between the two coupling portions 203' of the radiating arm comprises printed electrically conductive segments on its two major surfaces. Further, one or more electrically conductive elements, such as via holes, may be provided through the two major surfaces of the coupling portion 401' of the feed board so as to electrically connect the printed electrically conductive segments on the two major surfaces.

As can be seen from FIG. 3, the radiating arm supporting plate 3' has a slot. In the present embodiment, the slot is configured as the slot 301' described above. In other embodiments, they may be provided separately. The radiating arm 2' has a slot 204' corresponding to the slot 301' of the radiating arm supporting plate 3', the feeding board 4' includes a snap portion 402' formed only of a dielectric material (i.e., a PCB base material), and the snap portion 402' is inserted through the slot 301' of the radiating arm supporting plate 3' and the slot 204' and snapped onto the radiating arm 2' to thereby achieve the fixation between the radiating arm 2', the radiating arm supporting plate 3' and the feed board 4'. Furthermore, the radiator 1' may further comprise an additional fastening structure, which is configured to further restrict the relative movement therebetween.

Although the specific embodiments of the present disclosure have been described in detail by way of example, those skilled in the art should understand that the above examples are for illustrative purposes only and are not intended to limit the scope of the present disclosure. The various embodiments disclosed herein may be combined in any combination without departing from the spirit and scope of the disclosure. It should also be understood by those skilled in the art that various modifications may be made in the embodiments without departing from the scope and spirit of the disclosure.

That which is claimed is:

1. A radiator for an antenna, comprising:

a feed board having an electrically conductive segment, a printed circuit board ("PCB") that includes a PCB coupling arm portion having a printed electrically conductive segment; and a sheet metal radiating arm that is supported on the PCB, the sheet metal radiating arm including a first arm segment having a plurality of sides, the first arm segment extending in a first direction, a second arm segment that is bent to extend in a second direction from a first of the sides of the first arm segment, wherein the second direction is different from the first direction, and a third arm segment that is bent to extend in a third direction from a second of the sides of the first arm segment, the second of the sides opposite the first of the sides, wherein along a periphery of the first arm segment, a third of the sides is interposed in between the first of the sides and the second of the sides.

2. The radiator for an antenna according to claim 1, wherein the PCB coupling arm portion is capacitively coupled to the metal radiating arm.

3. The radiator for an antenna according to claim 1, wherein the electrically conductive segment of the PCB coupling arm portion is electrically connected to the electrically conductive segment of the feed board.

4. The radiator for an antenna according to claim 2, wherein a dielectric layer is provided between the at least a portion of the first arm segment of the metal radiating arm and the electrically conductive segment of the PCB coupling arm portion.

5. The radiator for an antenna according to claim 4, wherein the dielectric layer comprises a solder mask layer on a surface of the PCB coupling arm portion.

6. The radiator for an antenna according to claim 1, wherein the area of the PCB coupling arm portion is smaller than the area of the metal radiating arm.

7. The radiator for an antenna according to claim 1, wherein the area of the PCB coupling arm portion is smaller than the area of the first arm segment of the metal radiating arm.

8. A radiator for an antenna, comprising:

a feed board having an electrically conductive segment, a printed circuit board ("PCB") that includes a PCB coupling arm portion having a printed electrically conductive segment; and a sheet metal radiating arm that is supported on the PCB, the sheet metal radiating arm including a first arm segment extending in a first direction and a second arm segment that is bent to extend in a second direction from an outer side region of the first arm segment, wherein the second direction is different from the first direction, wherein the first arm segment of the metal radiating arm is supported on the PCB coupling arm portion in an orientation substantially parallel to the feed board, and the second arm segment of the metal radiating arm extends from the outer side region of the first arm segment in a direction that is parallel to the feed board and away from the PCB coupling arm portion.

9. A radiator for an antenna, characterized in that the radiator comprises a feed board and a metal radiating arm that includes a first arm segment extending in a first direction and a second arm segment extending in a second direction from an outer side region of the first arm segment, wherein the second direction is different from the first direction, wherein the radiator further includes a radiating arm supporting plate that comprises a dielectric material that supports the metal radiating arm, wherein the feed board feeds the metal radiating arm by means of a capacitive coupling, wherein the radiator is mounted on a reflector, the feed board extends forward from the reflector, and the radiating arm supporting plate is supported on the feed board in an orientation substantially parallel to the reflector.

10. The radiator for an antenna according to claim 9, wherein the metal radiating arm includes a coupling portion, the feed board includes a coupling portion having an electrically conductive segment, and the capacitive coupling is formed between the coupling portion of the metal radiating arm and the coupling portion of the feed board so as to feed the metal radiating arm.

11. The radiator for an antenna according to claim 9, wherein the first arm segment of the metal radiating arm is supported on the radiating arm supporting plate in an orientation substantially parallel to the reflector, and the second arm segment of the metal radiating arm extends from an outer side region of the first arm segment in a direction that is away from the reflector.

12. The radiator for an antenna according to claim 10, wherein the radiating arm supporting plate has a slot, and the coupling portion of the feed board is inserted through the slot such that the coupling portion of the feed board and the coupling portion of the metal radiating arm are opposite to each other.

13. The radiator for an antenna according to claim 9, wherein the feed board includes a snap portion formed only of dielectric material, the snap portion being inserted through a slot in the radiating arm supporting plate and a slot in the metal radiating arm to be snapped onto the radiating arm.

14. The radiator for an antenna according to claim 10, wherein the metal radiating arm has two coupling portions, the coupling portion of the feed board is disposed between the two coupling portions of the metal radiating arm, the coupling portion of the feed board comprising electrically conductive segments on its two major surfaces.

15. A radiator for an antenna, characterized in that the radiator comprises a PCB feed board, a metal radiating arm and a radiating arm supporting plate comprising a dielectric material, wherein the metal radiating arm includes a first arm segment extending in a first direction, and a second arm segment extending from an outer side region of the first arm segment in a second direction different from the first direction, wherein the first arm segment of the metal radiating arm is at least partially supported on the radiating arm supporting plate, wherein the metal radiating arm includes a coupling portion on its inner end region, the PCB feed board includes on its upper inner end region a coupling portion having a printed electrically conductive segment, and the coupling portion of the radiating arm and the coupling portion of the feed board are opposite to each other and thus a capacitive coupling is formed therebetween, and the PCB feed board feeds the metal radiating arm by means of the capacitive coupling, wherein the radiator is mounted on a reflector, the PCB feed board extends forward from the reflector, and the radiating arm supporting plate is supported on the PCB feed board in an orientation substantially parallel to the reflector, wherein the first arm segment of the radiating arm is supported on the radiating arm supporting plate in an orientation substantially parallel to the reflector, and the second arm segment of the radiating arm extends from an outer side region of the first arm segment in a direction that is away from the reflector.

16. The radiator for an antenna according to claim 15, wherein the metal radiating arm supporting plate has a slot, and the coupling portion of the PCB feed board is inserted through the slot so that the coupling portion of the PCB feed board and the coupling portion of the metal radiating arm are opposite to each other.

* * * * *